(12) United States Patent
Yoon et al.

(10) Patent No.: US 12,401,092 B2
(45) Date of Patent: Aug. 26, 2025

(54) SEPARATOR FOR ELECTROCHEMICAL DEVICE AND ELECTROCHEMICAL DEVICE COMPRISING SAME

(71) Applicant: LG ENERGY SOLUTION, LTD., Seoul (KR)

(72) Inventors: Yeo Ju Yoon, Daejeon (KR); Min Ji Kim, Daejeon (KR); Ji Eun Kim, Daejeon (KR); Dong Wook Sung, Daejeon (KR); Jin Young Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/566,844

(22) PCT Filed: Nov. 14, 2022

(86) PCT No.: PCT/KR2022/017863
§ 371 (c)(1),
(2) Date: Dec. 4, 2023

(87) PCT Pub. No.: WO2023/120984
PCT Pub. Date: Jun. 29, 2023

(65) Prior Publication Data
US 2024/0266672 A1 Aug. 8, 2024

(30) Foreign Application Priority Data
Dec. 21, 2021 (KR) .......... 10-2021-0184392

(51) Int. Cl.
*H01M 50/446* (2021.01)
*H01M 10/052* (2010.01)
(Continued)

(52) U.S. Cl.
CPC ....... *H01M 50/446* (2021.01); *H01M 50/403* (2021.01); *H01M 50/44* (2021.01); *H01M 50/491* (2021.01); *H01M 10/052* (2013.01)

(58) Field of Classification Search
CPC ............. H01M 10/052; H01M 50/446; H01M 50/403; H01M 50/44; H01M 50/491
See application file for complete search history.

(56) References Cited

U.S. PATENT DOCUMENTS

| | | | |
|---|---|---|---|
| 2017/0283565 A1* | 10/2017 | Ono ........................ | H01G 11/52 |
| 2019/0214623 A1* | 7/2019 | Kimura ............... | H01M 50/414 |
| 2022/0140436 A1* | 5/2022 | Jo ..................... | H01M 10/0525 |
| | | | 429/129 |

FOREIGN PATENT DOCUMENTS

| CN | 112652861 A | 4/2021 |
|---|---|---|
| CN | 112999896 A | 6/2021 |

(Continued)

OTHER PUBLICATIONS

International Search Report for PCT/KR2022/017863 (PCT/ISA/210) mailed on Mar. 13, 2023.
(Continued)

*Primary Examiner* — Karie O'Neill Apicella
(74) *Attorney, Agent, or Firm* — Birch, Stewart, Kolasch & Birch, LLP

(57) ABSTRACT

A separator for an electrochemical device, and an electrochemical device including the same are disclosed. The separator according to an exemplary embodiment of the present disclosure is a separator for an electrochemical device. The separator includes a porous polymer substrate and one porous coating layer on at least one surface of the porous polymer substrate. The porous coating layer includes inorganic hydroxide particles, cellulose nanoparticles, and an aqueous binder polymer. The amount of the cellulose (Continued)

nanofibers is 25% by weight or more and 70% by weight or less based on the total weight of the porous coating layer.

14 Claims, 1 Drawing Sheet

(51) Int. Cl.
*H01M 50/403* (2021.01)
*H01M 50/44* (2021.01)
*H01M 50/491* (2021.01)

(56) References Cited

FOREIGN PATENT DOCUMENTS

| JP | 2015084318 A | * | 4/2015 | ............. H01M 2/16 |
| JP | 2015-111546 A | | 6/2015 | |
| JP | 2016-62689 A | | 4/2016 | |
| JP | 2016062689 A | * | 4/2016 | ............. H01G 11/52 |
| JP | 2018-32537 A | | 3/2018 | |
| JP | 2018032537 A | * | 3/2018 | ............. H01M 2/16 |
| JP | 2018-63924 A | | 4/2018 | |
| JP | 6445273 B2 | | 12/2018 | |
| JP | 6550159 B1 | | 7/2019 | |
| JP | 2019-145428 A | | 8/2019 | |
| JP | 20190145428 A | * | 8/2019 | ............. H01M 2/16 |
| JP | 2021-523040 A | | 9/2021 | |
| KR | 10-1247248 B1 | | 3/2013 | |
| KR | 10-2016-0133275 A | | 11/2016 | |
| KR | 10-2019-0049327 A | | 5/2019 | |
| KR | 10-2019-0052588 A | | 5/2019 | |
| KR | 10-2137533 B1 | | 7/2020 | |
| KR | 10-2020-0110801 A | | 9/2020 | |
| KR | 10-2020-0112744 A | | 10/2020 | |
| KR | 10-2020-0129692 A | | 11/2020 | |
| KR | 10-2209826 B1 | | 1/2021 | |
| KR | 10-2021-0038490 A | | 4/2021 | |
| KR | 10-2021-0053035 A | | 5/2021 | |
| KR | 10-2021-0061137 A | | 5/2021 | |
| KR | 10-2277570 B1 | | 7/2021 | |
| WO | WO2023/066342 A1 | | 4/2023 | |

OTHER PUBLICATIONS

Written Decision on Registration for KR 10-2021-0184392 dated Oct. 6, 2023.
Extended European Search Report for European Application No. 22911622.3, dated Sep. 10, 2024.

* cited by examiner

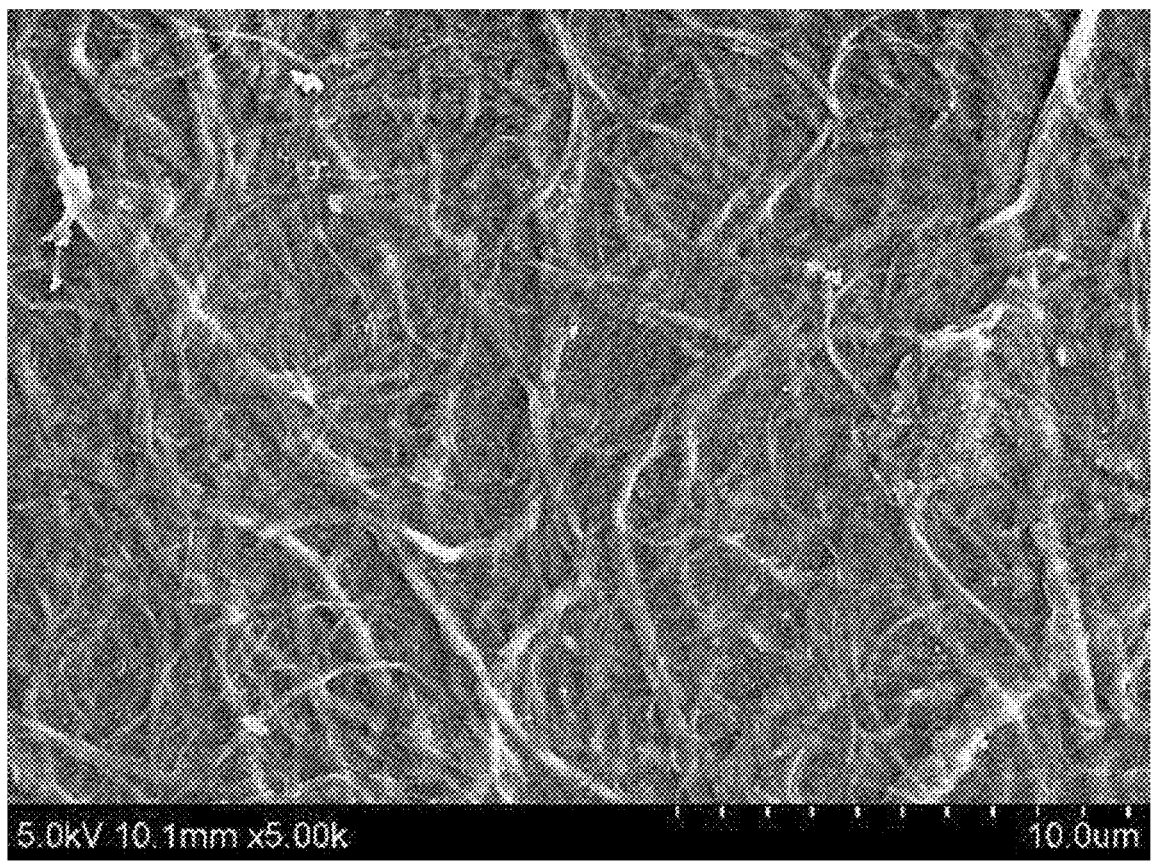

SEPARATOR FOR ELECTROCHEMICAL DEVICE AND ELECTROCHEMICAL DEVICE COMPRISING SAME

TECHNICAL FIELD

The present disclosure claims the benefit of the filing date of Korean Patent Application No. 10-2021-0184392 filed with the Korean Intellectual Property Office on Dec. 21, 2021, the entire contents of which is incorporated in the present disclosure by reference. The present disclosure relates to a separator for an electrochemical device having improved compression resistance and an electrochemical device including the same.

BACKGROUND ART

Recently, interest in energy storage technology has been increasing. Efforts for research and development of electrochemical devices are becoming more and more specific as the fields of application are expanded to mobile phones, camcorders, notebook PCs, and even the energy of electric vehicles. The electrochemical device is the field that is attracting the most attention in this respect, and among them, the development of a secondary battery capable of charging and discharging and a lithium secondary battery having a high energy density are the focus of attention. Recently, in developing such a secondary battery, there has been a great deal of attention to ensuring safety.

In lithium secondary batteries currently being produced, porous substrates using polyolefin-based polymer resins are used as separator substrates to prevent short circuits between the cathode and anode. However, the porous substrate has a problem in that heat resistance is low because the polymer substrate shrinks or melts at high temperatures. Accordingly, when a battery rises to a high temperature due to internal/external stimulation, the possibility of a short circuit increases due to the contraction or melting of a separator, and electrical energy is rapidly discharged, resulting in the explosion or ignition of the battery.

Therefore, in order to solve the above problems, a method of improving heat resistance by forming a porous coating layer in which inorganic particles and a binder polymer are mixed is widely used on at least one surface of a porous substrate.

Meanwhile, during the battery assembly process, a lamination process is performed in which heat and pressure are applied to impart adhesive strength to the electrode and the separator. At this time, due to the pressure applied to the separator, the inorganic particles in the porous coating layer press the porous substrate. In particular, since most of the inorganic particles used in the porous coating layer of the separator are in the form of spherical particles, the inorganic particles in the porous coating layer contact the porous substrate at a dot, and thus local pressure in the porous substrate is applied, and the pore structure is damaged or deformed. A battery employing such a separator is affected by resistance and lifespan characteristics, resulting in degradation of performance.

DISCLOSURE

Technical Problem

The present disclosure has been devised to solve the problems of the related art as described above, and an objective of the present disclosure is to provide a separator for an electrochemical device having improved compression resistance and an electrochemical device including the same.

Another objective of the present disclosure is to provide a method for manufacturing a separator for an electrochemical device having improved compression resistance.

It will be readily appreciated that other purposes and advantages of this disclosure can be realized by means or methods described in the claims, and combinations.

Technical Solution

The present inventors have found that the above problems can be solved through the following separator for an electrochemical device, an electrochemical device including the same, and a manufacturing method thereof.

According to an exemplary embodiment of the present disclosure, as a separator for an electrochemical device, the separator includes a porous polymer substrate and one porous coating layer on at least one surface of the porous polymer substrate. Provided is a separator for an electrochemical device, in which the porous coating layer may include inorganic hydroxide particles, cellulose nanofibers, and an aqueous, or water-based, binder polymer, and the amount of the cellulose nanofibers may be in a range of 25% to 70% by weight based on the total weight of the porous coating layer.

According to an exemplary embodiment of the present disclosure, the content of the cellulose nanofibers may be 30% by weight or more and 60% by weight or less based on the total weight of the porous coating layer.

According to an exemplary embodiment of the present disclosure, the inorganic hydroxide particles may hydrogen bond with at least one of the cellulose nanofibers and the aqueous, or water-based, binder polymer.

According to an exemplary embodiment of the present disclosure, the content of the inorganic hydroxide particles may be 10% by weight or more and 60% by weight or less based on 100% by weight of the total weight of the porous coating layer.

According to an exemplary embodiment of the present disclosure, the inorganic hydroxide particles may include aluminum hydroxide, magnesium hydroxide, calcium hydroxide, chromium hydroxide, zirconium hydroxide, nickel hydroxide, or a mixture of two or more thereof.

According to an exemplary embodiment of the present disclosure, the water-based binder polymer may include carboxymethyl cellulose (CMC), styrene-butadiene rubber (SBR), polyvinyl alcohol (PVA), polyacrylic acid (PAA), polyethylene glycol (PEG), polyacrylonitrile (PAN), polyacrylamide (PAM), or a mixture of two or more thereof.

According to an exemplary embodiment of the present disclosure, the length of the cellulose nanofibers may be in a range of 1 to 100 μm.

According to an exemplary embodiment of the present disclosure, when a pressure in a range of 1 to 10 MPa is applied to the separator for 1 to 60 seconds in a temperature range of 60° C. to 70° C., the thickness change rate of the porous polymer substrate before and after pressure is applied may be less than 5%.

An exemplary embodiment of the present disclosure provides an electrochemical device including a cathode, an anode, and a separator interposed between the cathode and the anode, in which the separator is the above-described separator.

According to an exemplary embodiment of the present disclosure, the electrochemical device may be a lithium secondary battery.

An exemplary embodiment of the present disclosure provides a method for manufacturing a separator for an electrochemical device, the method including: preparing a porous polymer substrate; and forming at least one porous coating layer by coating a slurry containing inorganic hydroxide particles, cellulose nanofibers, an aqueous, or water-based, binder polymer, and an aqueous solvent on at least one surface of the porous polymer substrate.

Advantageous Effects

Since the separator, according to the present disclosure, exhibits improved compression resistance, deformation of the separator can be suppressed even when pressure is applied. In particular, in the separator of the present disclosure, when pressure is applied, at least one porous coating layer formed on at least one surface of the porous substrate serves as a buffer, thereby reducing the pressure applied to the porous substrate and suppressing deformation of the separator.

DESCRIPTION OF DRAWINGS

The drawings attached to the present specification illustrate a preferred embodiment of the present disclosure and serve to better understand the technical idea of the present disclosure together with the contents of the present disclosure, and thus the present disclosure is not limited to and interpreted. On the other hand, the shape, size, scale, or ratio of elements in the drawings included in this specification may be exaggerated to emphasize a clearer description.

FIG. 1 shows an SEM image of a cross-section of the separator of Example 1.

BEST MODE

Hereinafter, the present disclosure will be described in detail. Prior to giving the following detailed description of the present disclosure, it should be noted that the terms and words used in the specification and the claims should not be construed as being limited to ordinary meanings or dictionary definitions but should be construed in a sense and concept consistent with the technical idea of the present disclosure, on the basis that the inventor can properly define the concept of a term to describe its disclosure in the best way possible.

Throughout this specification, when a part "includes" a certain component, it means that other components may be further included, rather than excluding other components, unless otherwise stated.

Throughout this specification, the description of "A and/or B" means "A or B or both".

A separator for an electrochemical device, according to an embodiment of the present disclosure, includes a porous polymer substrate and one porous coating layer formed on at least one surface of the substrate, and the porous coating layer includes inorganic hydroxide particles, cellulose nanofibers, and an aqueous binder polymer, in which the content of the cellulose nanofiber is 25% by weight or more and 70% by weight or less based on the total weight of the porous coating layer.

In general, a separator includes inorganic particles in a porous coating layer to improve heat resistance, and inorganic particles in the form of spherical particles are mainly used as the inorganic particles. However, when pressure is applied to the separator, the inorganic particles in the porous coating layer come into contact with the porous polymer substrate as a dot, and local pressure is applied in the porous polymer substrate so that the pore structure present in the porous polymer substrate damaged and/or deformed. Thus, a battery employing a separator having a damaged pore structure in a porous polymer substrate is affected by resistance and lifespan characteristics, resulting in degradation of performance.

In order to solve this problem, the inventors of the present disclosure adjust the composition in the porous coating layer to reduce the effect on the porous substrate by allowing the porous coating layer to act as a buffer even when pressure is applied to the separator.

First, it is intended to reduce local pressure within a porous polymer material, specifically, the pressure applied at a dot shape point of contact, by including a material that can be in contact with the porous coating layer in a line shape. Specifically, in the present disclosure, the pressure applied to the porous polymer substrate can be reduced by including a predetermined amount of line shape cellulose nanofibers in the porous coating layer.

Second, it is intended to disperse the pressure applied by the inorganic particles to the porous polymer substrate by enabling each component included in the porous coating layer to form a bond through interaction. In the present disclosure, one porous coating layer includes inorganic hydroxide particles, cellulose nanofibers, and a water-based binder polymer. Since the inorganic hydroxide particles, the cellulose nanofibers, and the aqueous binder polymer may include a functional group capable of forming a hydrogen bond between the respective components, an organic bond between the respective components is possible. For example, since the inorganic hydroxide particles can form hydrogen bonds with the cellulose nanofibers and/or the aqueous binder polymer, the pressure applied by the inorganic hydroxide particles to the porous polymer substrate can be dispersed. Also, for example, the cellulose nanofibers may form hydrogen bonds with the aqueous binder polymer. Accordingly, since the bonding force between the cellulose nanofibers and the aqueous binder polymer is strengthened, the separation of the porous coating layer itself is prevented, and the physical properties of the porous coating layer, such as increasing the peel strength of the porous polymer substrate, the shape of the porous coating layer may be maintained are improved. In addition, when pressure is applied to the separator, the pressure transmitted to the cellulose nanofibers is also dispersed in the aqueous binder polymer so that the entire porous coating layer can serve as a buffer. In particular, the inorganic hydroxide particles and cellulose nanofibers of the present disclosure are pressurized to a larger area than the spherical inorganic particles, thereby causing less damage to the porous polymer substrate. Also, since the materials present in the porous coating layer have a strong tensile modulus due to the hydrogen bonding of many functional groups, such as OH groups, the porous coating layer can serve as a buffer for the porous polymer substrate. Therefore, even if pressure is applied to the separator, the deformation of the separator is reduced so that the battery performance degradation problem can be suppressed.

The porous polymer substrate refers to a substrate in which a plurality of pores is formed as a porous ion-conducting barrier that passes ions while blocking electrical contact between a cathode and an anode. The pores are mutually connected to each other so that gas or liquid can pass from one surface of the substrate to the other surface. As such a substrate, a porous polymer film, including a thermoplastic resin, may be used from the viewpoint of imparting a shutdown function. Here, the shutdown function refers to a function of preventing thermal runaway of the battery by blocking the movement of ions by dissolving the thermoplastic resin and closing pores of the porous substrate when the battery temperature is high. The melting point of the thermoplastic resin is less than 200° C., and polyolefin resins such as polyethylene, polypropylene, polybutylene, and polypentene are preferable.

The thickness of the porous polymer substrate is not particularly limited but may be 1 μm or more and 100 μm or less, or 5 μm or more and 50 μm or less, and the pore size and porosity present in the porous polymer substrate are also not particularly limited, but each may be 0.01 μm or more and 50 μm or less and may be 10% or more and 95%.

The porous coating layer is formed on at least one surface of the porous polymer substrate. The porous coating layer includes inorganic hydroxide particles, cellulose nanofibers, and a water-based binder polymer.

The inorganic hydroxide particles included in the porous coating layer may be bound by cellulose nanofibers and/or aqueous binder polymers. In the present disclosure, each of the inorganic hydroxide particles, the cellulose nanofibers, and the water-based binder polymers can form hydrogen bonds or with each other, and an interstitial volume, which is a space limited by a structure connected by hydrogen bonds, is formed, and the interstitial volume may form a pore. For example, since cellulose nanofibers are not perfectly packed with each other, pores may exist between the fibers.

According to an exemplary embodiment of the present disclosure, the porous coating layer may be formed by forming two or more components of the inorganic hydroxide particles, cellulose nanofibers, and aqueous binder polymer in a bond. For example, the bond may be a hydrogen bond. In the present disclosure, it can be confirmed through X-ray diffraction (XRD) that the above components form a hydrogen bond. Specifically, since the intermolecular bond length can be confirmed through X-ray diffraction analysis, it is possible to analyze whether or not a hydrogen bond is formed.

Specifically, since the inorganic hydroxide particles can form hydrogen bonds with the cellulose nanofibers and/or the aqueous binder polymer, the pressure applied by the inorganic hydroxide particles to the porous polymer substrate can be dispersed so that even if pressure is applied to the separator, the porous deformation of the polymer substrate can be suppressed.

In particular, the present disclosure is characterized in that inorganic hydroxide particles, cellulose nanofibers, and an aqueous binder polymer are simultaneously included in one porous coating layer. Since inorganic hydroxide particles exist between the cellulose nanofibers and hydrogen bonds are formed between the components, a more excellent effect may be obtained in terms of compression resistance. Accordingly, cases in which inorganic hydroxide particles and cellulose nanofibers are respectively included in the plurality of porous coating layers are excluded from the present disclosure.

The specific type of the inorganic hydroxide particle is not limited, but, for example, aluminum hydroxide, magnesium hydroxide, calcium hydroxide, chromium hydroxide, zirconium hydroxide, nickel hydroxide, or a mixture thereof may be used. Preferably, aluminum hydroxide may be used.

The content of the inorganic hydroxide particles may be 10% by weight or more, 20% by weight, 25% by weight or more, 30% by weight or more, 60% by weight or less, or 50% by weight or less, based on 100% by weight of the total weight of the porous coating layer. When the content of the inorganic hydroxide particles based on the total weight of the porous coating layer satisfies the above range, there are advantageous effects in terms of heat resistance and dispersion stability. In particular, when the inorganic hydroxide particles are included more than the above range, dispersion stability may be degraded or it may be difficult to manage the viscosity of the slurry for forming the porous coating layer, and thus it may be difficult to control the thickness of the porous coating layer. In addition, when pressure is applied to the separator, a higher internal pressure acts on the inorganic hydroxide particles, which may be disadvantageous in terms of compression resistance.

The average particle diameter of the inorganic hydroxide particles is not particularly limited but may be preferably in the range of 0.001 μm or more and 10 μm or less, more preferably 100 nm or more and 2 μm or less, and even more preferably 150 nm or more and 1 μm or less, for forming a porous coating layer having a uniform thickness and appropriate porosity.

The cellulose nanofiber has lightweight and high strength, and does not expand even when heat is applied, and thus may be used in a porous coating layer of a separator, thereby being more advantageous in improving strength and heat resistance characteristics.

According to an exemplary embodiment of the present disclosure, the content of the cellulose nanofiber may be 25% by weight or more and 70% by weight or less based on 100% by weight of the total weight of the porous coating layer. According to an exemplary embodiment of the present disclosure, the content of the cellulose nanofibers may be 30% by weight or more and 60% by weight based on 100% by weight of the total weight of the porous coating layer. When the cellulose nanofiber is contained in an excessive amount than the suggested content range, the cellulose nanofiber may exhibit an inferior effect in terms of heat resistance and an inferior effect in terms of compression resistance when the cellulose nanofiber is contained in a small amount than the suggested content range.

The cellulose nanofibers may include functional groups capable of hydrogen bonding with inorganic hydroxyl particles and/or aqueous polymers. For example, the cellulose nanofibers may include —OH, —COO—, —COOH—, —NH$_2$ groups as functional groups capable of hydrogen bonding. Accordingly, the cellulose nanofibers form hydrogen bonds with the inorganic hydroxide particles and/or the water-based polymer in the porous coating layer to disperse the pressure applied by the inorganic hydroxide particles to the porous polymer substrate, and thus the porous coating layer may more faithfully function as a buffer, thereby providing a separator with improved compression resistance.

In addition, the diameter of the cellulose nanofibers may be 1 nm or more and 1 μm or less, preferably 50 nm or more and 500 nm or less, and more preferably 100 nm or more and 200 nm or less. When the diameter of the cellulose nanofibers is within the above range, more pores can be formed in the porous coating layer, and more hydrogen bonds can be formed with the inorganic hydroxide particles and/or the aqueous binder polymer so that after injection of the electrolyte, the wetting property can be further improved.

In addition, the length of the cellulose nanofibers may be 1 μm or more and 100 μm or less, preferably 30 μm or more and 100 μm or less, and more preferably 50 μm or more and 100 μm or less. When the length of the cellulose nanofibers is within the above range, it is easy to absorb the pressure that the inorganic hydroxide particles are subjected to when pressure is applied to the separator, and the pressure can be dispersed in the porous coating layer, so it can be more advantageous in terms of compression resistance.

The aqueous binder polymer is soluble in an aqueous solvent such as water. In addition, the aqueous binder polymer may include a functional group capable of forming a hydrogen bond with the inorganic hydroxyl particle and/or the aqueous polymer. The specific type of the water-based binder polymer is not limited but may include, for example, carboxymethyl cellulose (CMC), styrene-butadiene rubber (SBR), polyvinyl alcohol (PVA), polyacrylic acid (PAA), polyethylene glycol (PEG), polyacrylonitrile (PAN), polyacrylamide (PAM), or a mixture of two or more thereof. Preferably, carboxymethyl cellulose may be included as the aqueous binder polymer in terms of ensuring uniform coating properties.

The content of the aqueous binder polymer may be 5% by weight or more and 60% by weight or less, 5% by weight or more and 30% by weight or less, 10% by weight or more and 20% by weight or less based on 100% by weight of the total weight of the porous coating layer. When the content of the aqueous binder polymer based on the total weight of the porous coating layer satisfies the above range, the dispersibility of the inorganic hydroxide particles and the cellulose nanofibers may be improved when the porous coating layer is formed, and hydrogen bonds with inorganic hydroxide particles and/or cellulose nanofibers are sufficiently formed, which is advantageous in terms of compression resistance.

According to an exemplary embodiment of the present disclosure, the separator of the present disclosure, when comparing the thickness of the porous polymer substrate before and after the pressure of 1 MPa or more and 10 MPa is applied for 1 second or more and 60 seconds or less in the temperature range of 60° C. or more and 70° C. or less, the thickness change rate of the porous polymer substrate may be 5% or less, 4.5% or less, or 3% or more and 4.5% or less. For example, a pressure of 5.2 MPa may be applied for 10 seconds at a temperature of 70° C. to measure the thickness change rate of the porous polymer substrate before and after the pressure is applied. At this time, pressure can be applied to the separator using hot-press equipment, and the thickness of the porous polymer substrate can be measured using a thickness meter (Mitutoyo, VL-50S-B).

An exemplary embodiment of the present disclosure provides a method for manufacturing a separator for an electrochemical device, the method including: preparing a porous polymer substrate; and forming at least one porous coating layer by applying a slurry containing inorganic hydroxide particles, cellulose nanofibers, an aqueous binder polymer, and an aqueous solvent on at least one surface of the porous polymer substrate.

In the method for manufacturing a separator according to an exemplary embodiment of the present disclosure, a slurry may be prepared by dispersing inorganic hydroxide particles and cellulose nanofibers in an aqueous solvent as a dispersion medium and then adding an aqueous binder polymer. The aqueous solvent used as the dispersion medium is a polar solvent and may be water, methanol, ethanol, ethylene glycol, diethylene glycol, glycerol, or a mixture of two or more thereof.

Thereafter, at least one porous coating layer may be formed on at least one surface of the porous polymer substrate by applying and drying the prepared slurry to at least one surface of the porous polymer substrate.

An electrochemical device, according to an exemplary embodiment of the present disclosure, includes a cathode, an anode, and a separator interposed between the cathode and the anode, and the separator is the separator according to an exemplary embodiment of the present disclosure described above.

In an exemplary embodiment of the present disclosure, the electrochemical device is a device that converts chemical energy into electrical energy by an electrochemical reaction and includes all devices that undergo an electrochemical reaction, for example, all types of primary and secondary batteries, fuel cells, solar cells, and capacitors such as supercapacitor devices. In particular, a lithium secondary battery including a lithium metal secondary battery, a lithium ion secondary battery, a lithium polymer secondary battery, or a lithium ion polymer secondary battery among the secondary batteries, is preferable.

The electrode to be applied together with the separator of the present disclosure is not particularly limited, and an electrode active material may be prepared in a form bound to an electrode collector according to a conventional method known in the art.

Non-limiting examples of the cathode active material among the electrode active materials may include a conventional cathode active material that may be used in a cathode of a conventional lithium secondary battery, and particularly, lithium manganese oxide, lithium cobalt oxide, lithium nickel oxide, lithium iron oxide, or a combination thereof may be used.

Non-limiting examples of the anode active material may include a conventional anode active material that may be used in the anode of a conventional lithium secondary battery, and particularly, lithium metal or lithium alloy, lithium adsorption materials such as carbon, petroleum coke, activated carbon, graphite, or other carbons may be used.

Non-limiting examples of the cathode collector may include a foil made of aluminum, nickel, or a combination thereof, and non-limiting examples of the anode collector may include a foil made of copper, gold, nickel, or a copper alloy, or a combination thereof.

The electrolyte that can be used in the electrochemical device of the present disclosure is a salt having the same structure as $A^+B^-$, and $A^+$ includes ions formed of alkali metal cations such as $Li^+$, $Na^+$, $K^+$, or a combination thereof, or $B^-$ includes $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or a combination thereof. In the electrolyte, the salt may be dissolved or dissociated in an organic solvent or an organic solvent consisting of a mixture thereof including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma butyrolactone (γ-butyrolactone), but is not limited thereto.

The electrolyte injection may be performed at an appropriate stage in the battery manufacturing process according to the manufacturing process and required physical properties of the final product. That is, the electrolyte injection may be applied before assembling the battery or in the final stage of assembling the battery.

In addition, the present disclosure provides a battery module including a battery including the electrode assembly as a unit cell, a battery pack including the battery module, and a device including the battery pack as a power source. Specific examples of the device include a power tool powered by a battery motor; electric vehicles including electric vehicles (EVs), hybrid electric vehicles (HEVs), plug-in hybrid electric vehicles (PHEVs), and the like; electric two-wheeled vehicles including electric bicycles (E-bikes)

and electric scooters (E-scooter); electric golf carts; and a power storage system, but is not limited thereto.

MODE FOR INVENTION

Hereinafter, examples will be given to describe the present disclosure in detail. However, the embodiments according to the present disclosure may be modified in various other forms, and the scope of the present disclosure should not be construed as being limited to the embodiments described below. The embodiments of the present disclosure are provided to more completely explain the present disclosure to those of ordinary skilled in the art.

EXAMPLE

Examples 2 to 4 and Comparative Examples 1 to 2

Separators of Examples 1 to 4 and Comparative Examples 1 to 5 were prepared according to the following method. The ratio of components included in the porous coating layer of the prepared separator is as shown in Table 1.

[Preparation of Cellulose Nanofibers]
1. Cellulose powder was added to 2% by weight of NaOH solution and vigorously stirred for 1 hour.
2. After washing the treated cellulose powder with distilled water, the washed cellulose powder was added to an isopropyl alcohol (IPA)-distilled water mixed solvent and stirred for 12 hours using a homogenizer.
3. Cellulose nanofibers (CNF) prepared in a cellulose solution were filtered.
4. Cellulose nanofibers were recovered after drying at 80° C. for 2 days.

The recovered cellulose nanofibers were mixed with cellulose nanofibers having a diameter of 50 to 500 nm and a length of 30 to 100 μm.

[Preparation of Separator]
1. A polyethylene porous film (thickness of 9 μm, porosity of 45%) was prepared as a porous polymer substrate.
2. After preparing distilled water, the prepared cellulose nanofibers (CNF), aluminum hydroxide (inorganic hydroxide particles) with an average particle diameter of 400 nm, and carboxymethyl cellulose (aqueous binder polymer) were added thereto, and the mixture was stirred to prepare a slurry for forming a porous coating layer. The solid content of the prepared slurry was 30%.
3. The slurry was applied to one surface of a polyethylene porous film using a bar coater and then dried to prepare a separator, including a porous coating layer described in Table 1 below.

Comparative Example 6

1. A polyethylene porous film (thickness of 9 μm, porosity of 45%) was prepared as a porous polymer substrate.
2. After preparing distilled water, the prepared cellulose nanofibers (CNF) and carboxymethyl cellulose (aqueous binder polymer) were added, and stirred to prepare a slurry for forming a first porous coating layer. The solid content of the prepared slurry was 30%.
3. After preparing distilled water, aluminum hydroxide (inorganic hydroxide particles) with an average particle diameter of 400 nm and carboxymethyl cellulose (aqueous binder polymer) were added, followed by stirring to prepare a slurry for forming a second porous coating layer. The solid content of the prepared slurry was 30%.
4. The slurry for forming the first porous coating layer is applied on one surface of a polyethylene porous film using a bar coater and dried to form the first porous coating layer (first layer, thickness 3 μm) shown in Table 1 below. A slurry for forming a second porous coating layer was applied on one surface of the first porous coating layer and then dried to form a second porous coating layer (second layer, thickness 3 μm) shown in Table 1 below to prepare a separator.

Evaluation Result

For the separators of Examples 1 to 4 and Comparative Examples 1 to 6, each physical property was measured before pressure was applied and after a pressure of 5.2 MPa was applied for 10 seconds at a temperature of 70° C., and the change rate is shown in Table 1.

A method for measuring specific physical properties for evaluating compression resistance is as follows.

(1) Thickness of Porous Polymer Substrate and Thickness Change Rate of a Porous Polymer Substrate The thickness of the Polymer substrate was measured using a thickness meter (Mitutoyo, VL-50S-B).

The thickness change rate of the porous polymer substrate was calculated by Formula 1 below.

$$\text{Thickness change rate (\%) of porous polymer substrate} = \\ [(\text{thickness before pressurizing} - \text{thickness after pressurizing})/ \\ (\text{thickness before pressurizing})] \times 100 \quad \text{[Formula 1]}$$

(2) Air Permeability of the Separator and Air Permeability Change Rate of the Separator The air permeability of the separator was measured using the Asahi Seiko reciprocating air permeability meter. In this case, the time for 100 cc of air to pass through a diameter of 28.6 mm and an area of 645 mm$^2$ was measured.

The air permeability change rate of the separator was calculated by Formula 2 below.

$$\text{Air permeability change rate of separator (\%)} = \\ [(\text{air permeability before pressurization} - \\ \text{air permeability after pressurization})/ \\ (\text{air permeability before pressurization})] \times 100 \quad \text{[Formula 2]}$$

(3) Resistance of Separator and Resistance Change Rate of the Separator

The resistance value when the separator was immersed in the electrolyte was measured by the alternating current method (Frequency 10,000 Hz to 100,000 Hz) at 25° C. using the following electrolyte. For the electrolyte solution, ethylene carbonate (EC) and ethylmethyl carbonate (EMC) were mixed as solvents in a composition of 3:7 (volume ratio), vinylene carbonate (VC) was added in an amount of 2% by weight based on the solvent, and LiPF$_6$ was added to a concentration of 1 M.

The resistance change rate of the separator was calculated by Formula 3 below.

$$\text{Air permeability change rate of separator (\%)} = [(\text{air} \\ \text{permeability before pressurization} - \text{air permeability after pressurization})/(\text{air permeability} \\ \text{before pressurization})] \times 100 \quad \text{[Formula 3]}$$

TABLE 1

| | Porous coating layer (% by weight) | | | | | Compression resistance evaluation | | |
|---|---|---|---|---|---|---|---|---|
| | Type | | Inorganic Hydroxide Particles | CNF | Water-based binder polymer | Thickness change rate (%) of porous polymer substrate | Air permeability change rate of separator (%) | Resistance change rate of separator (%) |
| Example 1 | Single layer | | 30 | 60 | 10 | 3.2 | 10.2 | 2 |
| Example 2 | Single layer | | 40 | 50 | 10 | 3.9 | 14.9 | 5 |
| Example 3 | Single layer | | 60 | 30 | 10 | 4.2 | 17.2 | 7 |
| Example 4 | Single layer | | 50 | 40 | 10 | 4.0 | 16.9 | 6 |
| Comparative Example 1 | Single layer | | 70 | 20 | 10 | 8.2 | 25.2 | 24 |
| Comparative Example 2 | Single layer | | 75 | 15 | 10 | 8.4 | 27.2 | 25 |
| Comparative Example 3 | Single layer | | 80 | 10 | 10 | 12.8 | 50.7 | 29 |
| Comparative Example 4 | Single layer | | 85 | 5 | 10 | 13.2 | 52.4 | 34 |
| Comparative Example 5 | Single layer | | 5 | 85 | 10 | 9.8 | 22.8 | 23 |
| Comparative Example 6 | Double layer | First layer | 0 | 80 | 20 | 8.8 | 21.2 | 24 |
| | | Second layer | 90 | 0 | 10 | | | |

The invention claimed is:

1. A separator for an electrochemical device, comprising:
   a porous polymer substrate; and
   a porous coating layer on at least one surface of the porous polymer substrate,
   wherein the porous coating layer comprises inorganic hydroxide particles, cellulose nanofibers, and a water-based binder, and
   wherein the cellulose nanofibers are present in an amount of 25% by weight or more and 70% by weight or less based on a total weight of the porous coating layer.

2. The separator of claim 1, wherein the cellulose nanofibers are present in an amount of 30% by weight or more and 60% by weight or less based on the total weight of the porous coating layer.

3. The separator of claim 1, wherein the inorganic hydroxide particles are hydrogen-bonded to at least one of the cellulose nanofibers or the water-based binder.

4. The separator of claim 1, wherein the inorganic hydroxide particles are present in an amount of 10% by weight or more and 60% by weight or less based on 100% by weight of the total weight of the porous coating layer.

5. The separator of claim 1, wherein the inorganic hydroxide particles comprise at least one of aluminum hydroxide, magnesium hydroxide, calcium hydroxide, chromium hydroxide, zirconium hydroxide, or nickel hydroxide.

6. The separator of claim 1, wherein the water-based binder polymer comprises at least one of carboxymethyl cellulose (CMC), styrene butadiene-rubber (SBR), polyvinyl alcohol (PVA), polyacrylic acid (PAA), polyethylene glycol (PEG), polyacrylonitrile (PAN), or polyacrylamide (PAM).

7. The separator of claim 1, wherein the cellulose nanofibers have a length of 1 μm or more and 100 μm or less.

8. The separator of claim 1, wherein when a pressure of 1 MPa or more and 10 MPa or less is applied to the separator in a temperature range of 60° C. or more and 70° C. for 1 second or more and 60 seconds or less, a thickness change rate of the porous polymer substrate before and after the application of the pressure is 5% or less.

9. An electrochemical device, comprising:
   a cathode,
   an anode, and
   a separator interposed between the cathode and the anode,
   wherein the separator is the separator of claim 1.

10. The electrochemical device of claim 9, wherein the electrochemical device is a lithium secondary battery.

11. A method of manufacturing the separator of claim 1, the method comprising:
    preparing the porous polymer substrate; and
    forming at least one porous coating layer by applying a slurry comprising inorganic hydroxide particles, cellulose nanofibers, the water-based binder polymer, and an aqueous solvent on at least one surface of the porous polymer substrate.

12. The separator of claim 1, wherein the porous polymer substrate has a thickness change rate of 5% or less, the thickness change rate being a change in a thickness measured before and a thickness measured after application of a pressure of 1 MPa or more and 10 MPa or less applied to the separator in a temperature range of 60° C. or more and 70° C. for 1 second or more and 60 seconds or less.

13. The separator of claim 1, wherein the cellulose nanofibers have a length of 30 μm or more and 100 μm or less.

14. The separator of claim 1, wherein the cellulose nanofibers are present in an amount of 30% by weight or more and 60% by weight or less based on the total weight of the porous coating layer, and
    wherein the inorganic hydroxide particles are present in an amount of 30% by weight or more and 60% by weight or less based on 100% by weight of the total weight of the porous coating layer.

* * * * *